(12) United States Patent
Georgopoulos et al.

(10) Patent No.: US 12,135,746 B2
(45) Date of Patent: Nov. 5, 2024

(54) AUTOMATIC KNOWLEDGE GRAPH CONSTRUCTION

(71) Applicant: International Business Machines Corporation, Armonk, NY (US)

(72) Inventors: Leonidas Georgopoulos, Zurich (CH); Dimitrios Christofidellis, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 17/035,839

(22) Filed: Sep. 29, 2020

(65) Prior Publication Data

US 2022/0100800 A1 Mar. 31, 2022

(51) Int. Cl.
*G06F 16/901* (2019.01)
*G06F 16/33* (2019.01)
*G06N 5/04* (2023.01)
*G06N 20/00* (2019.01)

(52) U.S. Cl.
CPC ...... *G06F 16/9024* (2019.01); *G06F 16/3344* (2019.01); *G06N 5/04* (2013.01); *G06N 20/00* (2019.01)

(58) Field of Classification Search
CPC . G06F 16/9024; G06F 16/3344; G06N 20/00; G06N 5/04
See application file for complete search history.

(56) References Cited

U.S. PATENT DOCUMENTS 11,151,982 B2 * 10/2021 Tomkins ............... G10L 15/197
2018/0082183 A1   3/2018 Hertz et al.
2019/0252074 A1   8/2019 Datla
(Continued)

FOREIGN PATENT DOCUMENTS

CN    108920527 A    11/2018
CN    109815345 A     5/2019
(Continued)

OTHER PUBLICATIONS

Chen et al., "A Tutorial on Network Embeddiings," arXiv:1808.02590v1 [cs.SI] Aug. 8, 2018, 23 pgs.
(Continued)

*Primary Examiner* — Beau D Spratt
(74) *Attorney, Agent, or Firm* — Scott S. Dobson (57) ABSTRACT

A method for building a new knowledge graph may be provided. The method comprises providing an existing knowledge graph, sampling random walks through the existing knowledge graph, determining embedding vectors for vertices and edges of the sampled random walks, and training of a machine-learning model taking as input sequences of the embedding vectors of the random walks. Furthermore, the method comprise receiving a set of documents determining sequences of terms from phrases from the documents the documents, building sequences of embedding vectors from the determined sequences of terms from the phrases, and using the built sequences of embedding vectors from the determined sequences of terms from the phrases as input for the trained machine-learning model for predicting second sequences of terms. Finally, the method comprises merging the predicted second sequences of terms thereby building the new knowledge graph.

25 Claims, 7 Drawing Sheets

(56) References Cited

U.S. PATENT DOCUMENTS

| | | | |
|---|---|---|---|
| 2021/0097502 A1* | 4/2021 | Hilleli | G06N 3/08 |
| 2021/0174906 A1* | 6/2021 | Ul Ain | G16B 25/00 |
| 2021/0216725 A1* | 7/2021 | Li | G06F 40/30 |
| 2021/0216881 A1* | 7/2021 | McCarthy | G06F 18/22 |
| 2021/0374279 A1* | 12/2021 | Zheng | G06N 3/088 |
| 2021/0406779 A1* | 12/2021 | Hu | G06N 3/045 |
| 2022/0121695 A1* | 4/2022 | Zhang | G06F 40/40 |
| 2023/0178199 A1* | 6/2023 | Soltani Bidgoli | G16H 50/20 705/3 |

FOREIGN PATENT DOCUMENTS

| | | |
|---|---|---|
| CN | 109992673 A | 7/2019 |
| CN | 110704640 A | 1/2020 |
| CN | 111160564 A | 5/2020 |
| WO | 2019099310 A1 | 5/2019 |

OTHER PUBLICATIONS

Examination report No. 1 for standard patent application, Australia Application No. 2021351210, Aug. 8, 2023, 5 pgs.

Onal et al., "Neural information retrieval: at the end of the year years," Inf Retrieval J (2018) 21:111-182, https://doi.org/10.1007/s10791-017-9321y, 72 pgs.

Setia et al., "Query a knowledge base for documents", IBM, IBM Developer, Published Date: Sep. 17, 2018, 5 pages. https://developer.ibm.com/patterns/algorithm-that-gives-you-answer-to-any-particular-question-based on-mining-documents/.

Huang et al., "Knowledge Graph Embedding Based Question Answering", WSDM '19, Feb. 11-15, 2019, Melbourne, VIC, Australia, 9 pages.

Neha, "Build a knowledge graph from documents", IBM Developer, printed May 19, 2020, Published Date: Sep. 14, 2018, 6 pages. https://developer.ibm.com/patterns/build-a-domain-specific-knowledge-graph-from-given-set-of-documents/.

International Search Report and Written Opinion for Application PCT/IB2021/057586, Nov. 25, 202, 6 pages.

* cited by examiner

AUTOMATIC KNOWLEDGE GRAPH CONSTRUCTION

BACKGROUND

The invention relates generally to knowledge graphs, and more specifically, to a method for building a new knowledge graph. The invention relates further to a knowledge graph construction system for building a knowledge graph, and a computer program product.

Artificial intelligence (AI) is one of the hot topics in the IT (information technology) industry. It is one of the fastest developing areas in technology. A lack of available skills in parallel to the fast developing of large amounts of algorithms and systems makes the situation even worse. Enterprises and science have started some time ago to organize knowledge and data as knowledge graphs comprising facts and relationships between the facts. However, the construction of knowledge graphs from the ever-growing amount of data is a labor-intensive and not well-defined process. A lot of experience is required. Currently, a typical approach is to define specific parsers and run them against a corpus of information, e.g., a plurality of documents, in order to detect relationships between facts and assign a specific weight to them. The expert needs then to put them together in a new knowledge graph.

Defining, coding and maintaining parsers in the ever-changing context of big data and maintaining the associated infrastructure is a difficult task even for the largest companies and organizations. The parsers are typically content and knowledge domain specific and their development may require highly skilled people. Thus, a parser, developed for one knowledge domain, cannot be used in a one-to-one fashion for another corpus or another knowledge domain.

For example, some methods in the field of knowledge base application technologies may obtain a triplet entity structure vector together with a description document of each entity in the triplet entity structure vector. Then, a statistical processing for the word segmentation on the description document is performed to obtain a document work distribution matrix. From there, a keyword vector matrix is obtained and converted into a multi-domain knowledge map triplet information space.

Additionally, document CN 110704640 A discloses a method and a device for representing and learning a knowledge graph, wherein the knowledge graph is learned and an entity to be learned is obtained from the acquired knowledge graph. Thereby, an entity-word heterogeneous graph can capture local and global semantic relations between entities, and words and short distance semantic relations and long-distance semantic relations between the entities and words can be used.

A disadvantage of the known solutions may be that still highly qualified personnel are required. Therefore, the question how to efficiently solve the problem of creating a knowledge graph is a technical problem that may need an urgent technical solution.

SUMMARY

According to one aspect of the present invention, a method for building a new knowledge graph may be provided. The method may comprise receiving at least one existing knowledge graph, sampling random walks though the at least one existing knowledge graph, determining embedding vectors for vertices and edges of the sampled random walks, and training of a machine-learning model, thereby building a trained machine-learning model enabled to predict sequences of terms.

The method comprises further providing a set of documents determining sequences of terms from phrases from documents from the set of documents, building sequences of embedding vectors from the determined sequences of terms from the phrases, and using the built sequences of embedding vectors from the determined sequences of terms from the phrases as input for the trained machine-learning model for predicting second sequences of terms.

Last but not least, the method may comprise merging the predicted second sequences of terms, thereby building the new knowledge graph.

According to another aspect of the present invention, a knowledge graph construction system for building a knowledge graph may be provided. The knowledge graph construction system may comprise a memory communicatively coupled to a processor, wherein the processor, using program code stored in the memory, is configured to receive at least one existing knowledge graph, sample random walks through the at least one existing knowledge graph, determine embedding vectors for vertices and edges of the sampled random walks, and train a machine-learning model thereby building a trained machine-learning model enabled to predict sequences of terms, taking as input sequences of the embedding vectors of the random walks.

Moreover, the processor of the knowledge graph construction system, using program code stored in the memory, may also be configured to provide a set of documents, determine sequences of terms from phrases from documents from the set of documents, build sequences of embedding vectors from the determined sequences of terms from the phrases, use the built sequences of embedding vectors from the determined sequences of terms from the phrases as input for the trained machine-learning model for predicting second sequences of terms, and merge the predicted second sequences of terms thereby building the new knowledge graph.

The proposed method for building a new knowledge graph may offer multiple advantages, technical effects, contributions and/or improvements.

The technical problem of building automatically a knowledge graph is addressed. This way, the knowledge graphs may be generated and may require less technical experts as traditional approaches do. The new knowledge graphs may also be generated as a service by a service provider. For this, an existing knowledge graph typically of a specific knowledge domain may be used to train a machine-learning model system in order to generate the new knowledge graph from a new corpus of documents without additional human intervention.

In general, also a more general knowledge graph—eventually also from another knowledge domain—may be used to train the machine-learning model. However, better results for the newly generated knowledge graph can be expected when using an existing knowledge graph within the same domain knowledge area.

A wide variety of documents for the new corpus may be used, as detailed below. The documents do not have to be prepared in a specific way. However, the documents may be pre-processed as part of the here proposed method.

The principle of the technical concept proposed here may be based on the fact that terms and phrases may be related more closely to one another the closer related embedding vectors are to one another, i.e., the closer the relative embedding vectors are to each other.

Hence, a plurality of new knowledge graphs may be generated automatically based on the core technology of an existing knowledge graph and a trained machine-learning system specific to the knowledge domain of the existing knowledge graph. No highly skilled personnel are required and the generation of the newly constructed knowledge graph can be automated and provided as a service.

In the following, additional embodiments of the presently described concepts, applicable to the method as well as to the system, will be described below in more detail.

According to an advantageous embodiment, the method may also comprise receiving a natural language query comprising a query sequence of terms, determining query embedding vectors for the query sequence of terms, and predicting, using the trained machine-learning model, a result sequence of terms by using the query embedding vectors as input for the trained machine-learning model. Hence, with the proposed method it may become possible to build, in an almost completely automated way, a question-and-answer machine for a specific topic by providing an existing knowledge graph relating to the same topic and set of documents from which the question-and-answer machine may be constructed automatically. Thereby, the original knowledge graph is typically not part of the constructed question-and-answer machine. Thus, a strict differentiation between the basis (i.e., the existing knowledge graph) and the newly built knowledge graph may be maintained. No interference may happen among them.

According to one optional embodiment, the method may also comprise storing the predicted result sequence of terms. This may enable faster answers from the underlying machine (e.g., using the question-and-answer machine) because it is not required to re-build the answer by using the trained machine-learning model. Instead, the earlier generated answer may simply be reused. This may be particularly advantageous if the proposed method may be used as FAQs (frequently asked questions) answering machine.

According to one advanced embodiment, the method may also comprise returning documents and/or references to documents from the set of provided documents relating to the result sequence terms. This way, the method—e.g., in the form of a question-and-answer machine—may not work as a black box but may also deliver evidence for the given answers supported by documents or fragments of documents on which the respective answer may be based on. Instead of the complete documents, alternatively pointers to the documents may be returned.

According to one permissive embodiment of the method, starting points of the random walks may be selected from the group comprising a randomly selected leaf of the existing knowledge graph—e.g., in case of meshed knowledge graphs—a root of the existing knowledge graph—e.g., in the case of hierarchical knowledge graphs, taking random path along the treelike KG—and a selected vertex of the existing knowledge graph, wherein the selection is performed based on a predefined rule. Hereby, the predefined rule may have various forms. For example, the random walks may always start at the same vertex (similar to the case of the hierarchical knowledge graph) or random walks may start from randomly selected vertices of a specific—e.g., core group—of vertices. Generally, no restrictions may be made to the selection.

According to one additional embodiment of the method, the phrases of the documents may be selected from the group comprising an individual term—e.g., in the form of an expression or a word—a plurality subsequent (or concatenated) terms—i.e., a group of words, isolated by a parser—and, a (complete) sentence. Furthermore, also two or more sentences may be used. This may be made dependent on the structure of the documents. In some cases, it may also be useful if a complete paragraph may be used as the phrase. Finally, the definition of the phrase may be a configurable parameter of the underlying system.

According to one preferred embodiment of the method, the machine-learning model may be a sequence-to-sequence machine-learning model. Sequence-to-sequence learning (seq2seq) is about training models to convert sequences from one domain (e.g., the given knowledge graph or, in another context, one language, e.g., English) to sequences in another domain (e.g., the newly constructed knowledge graph or, in the context, the same sentences translated to another language, e.g., French). This may be used for the here proposed free-form question answering (generating a natural language answer given a natural language question). In general, it may be applicable at any time when text may need to be generated. There are multiple ways to handle such a task, e.g., RNNs (recurrent neural network) or using 1D convnets (one dimensional convolutional network).

According to an interesting embodiment of the method, the set of documents may be an article, a book, a whitepaper, a newspaper, conference proceedings, a magazine, a chat protocol, a manuscript, handwritten notes—in particular, using optical character recognition (OCR)—a server log, or an email thread, or any mixture thereof. In general, every one or more larger (i.e., larger than a predefined number) collection of phrases may be used as the basis to construct the new knowledge graph.

According to one useful embodiment of the method, the merging may comprise building a plurality of tuples of edges and linked vertices—in particular, two linked vertices to one edge—from the predicted second sequence of terms. Thereby, edges and vertices of the new knowledge graph may correspond to terms in the provided set of documents, and metadata for terms characterizing the term being an edge or a vertex may be provided as additional output of the trained machine-learning system. Hence, also additional information being available in the underlying corpus for constructing the new knowledge graph may be used in (i) the construction process of the new knowledge graph and (ii) the generation of answer predictions using the trained machine-learning model, i.e., answers, whereby also the reasoning may become transparent.

According to one enhanced embodiment, the method may also comprise storing provenance data for the edges and the vertices together with the edges and the vertices, respectively. Such provenance data may also be treated as metadata. Through the provenance data, the underlying knowledge graph system and a related question-and-answer machine may provide to a user examples to understand the reasoning and the basis for the predicted answer.

According to another useful embodiment of the method, the result sequence of terms may be a sequence of edges and related vertices in the knowledge graph. Hence, the natural structure of the newly constructed knowledge graph may be used as the basis for the answer to a natural language query. To be more precise, the result sequence of terms may be the terms stored in the vertices and edges. This understanding and interpretation of vertices and edges may be valid throughout this document.

According to a further enhanced embodiment of the method, a natural language system may transform the sequence of edges—i.e., the term stored "in" the edge (i.e., in a memory related to the edge—and related vertices—i.e., the terms stored "in" the vertices (i.e., memories related to the vertices)—into a human understandable form. For this, between the terms of the edges and vertices extracted from the knowledge graph, the natural language system may only need to add some "language glue" in form of conjunctions and eventually verbs to build the complete, human interpretable sentences.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the present disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the present disclosure is not limited.

Some embodiments of the invention will be described, by way of example only, and with reference to the following drawings:

FIG. 6 shows a block diagram of the knowledge graph construction system, according to at least one embodiment.

FIG. 7 shows an embodiment of a computing system comprising the knowledge graph construction system according to FIG. 6.

DETAILED DESCRIPTION

In the context of this description, the following conventions, various terms and/or expressions may be used.

The term 'knowledge graph' may denote a data structure comprising vertices and edges linking selected ones of the vertices. A vertex may represent a fact, term, phrase or word, and an edge between two vertices may express that a relationship may exist between the linked vertices. The edge may also carry a weight, i.e., a weight value may be assigned to each of the plurality of edges. A knowledge graph may comprise thousands or millions vertices and even more edges. Different types of structures are known hierarchical or circular or spherical ones with no real center or origin. Knowledge graphs may grow by adding new terms (i.e., vertices) and link then via new edges to existing vertices. A knowledge graph may also be organized as a plurality of edges with two vertices each.

The term 'existing knowledge graph' may denote a knowledge graph that may exist before the here proposed method has been executed. The knowledge graph may, e.g., have been constructed by an expert for a specific knowledge domain In contrast to this is the 'newly created knowledge graph'. It starts to exist after the method has been executed. Typically, the new knowledge graph exists independently from the existing knowledge graph and may be deployed in a completely different environment.

The term 'random walk' may denote a process of string at one vertex of a knowledge graph and traversing to another vertex via an edge. Typically, a vertex may relate to a couple of edges linking the vertex to a plurality of other vertices. Randomness may result from random selections of edges traversed. The random walk may end, if the process arrives at a leaf of the knowledge graph, i.e., a vertex relating only to the incoming edge. As a result, a plurality of sequences of vertices and edges may be generated. A vertex linked by an edge may be seen as relatively close (e.g., content-wise) to each other. In case of a tree-like knowledge graph each new random walk may start again and again at the root but taking different routes through the branches until a leaf is reached. A random walk may also end after a predefined number of vertexes and edges have been touched. As a simple example there may be the two vertices 'monkey' and 'banana". These two vertices may be linked by the edge "gets eaten by" or "is liked by". From this, two possible sequences may be generated: (i) 'banana is liked by monkey' and banana get eaten by monkey". Although the vertexes are present on both sequences, the sequences would count as different due to the different edges.

The term 'embedding vector' may denote a vector with real value components generated from a term, word or phrase. Generally, word embedding may denote the collective name for a set of language modelling and feature learning techniques in natural language processing (NLP) where words or phrases from the vocabulary are mapped to vectors of real numbers. Conceptually, it may involve a mathematical embedding from a space with many dimensions per word to a continuous vector space with a much lower dimension. Methods to generate this mapping include neural networks, dimensionality reductions on the word co-occurrence matrix probabilistic models, explainable knowledge base methods, and explicit representation in terms of the context in which words appear. It may be seen as a transformation for a word room to a vector room. If in the word room two expression/terms are somehow linked by an edge expressing their relationship, the embedding vector would also have a short distance in the related vector room, e.g., Gaussian distance.

The term 'machine-learning'—and based on that the term 'machine-learning model'—may denote known methods of enabling a computer system that may improve its capabilities automatically through experience and/or repetition without procedural programming Thereby, machine-Learning (ML) can be seen as a subset of artificial intelligence. Machine-learning algorithms build a mathematical model—i.e, the machine-learning model—based on sample data, known as "training data", in order to make predictions or decisions without being explicitly programmed to do so. One implementation option may be to use a neutral network comprising nodes for storing fact values and/or a transformation function to transform incoming signal. Furthermore, selected ones of the nodes may be linked to each other by edges (connections), potentially having a weight factor, i.e., expressing a strength of the link which may be interpreted as an input signal for one of the cores. Beside neural networks (NN) with only 3 layers of cores (input layer, hidden layer, output layer), also NN with a plurality of hidden layers of various forms exist.

The term 'set of documents' may denote a corpus of data or knowledge preferably related to a specific knowledge domain. The form, the document may be provided may not really matter. It may come in various forms of which an article, a book, a whitepaper, a newspaper, conference proceedings, a magazine, a chat protocol, a manuscript, handwritten notes, a server log, or an email thread are only examples. Any mixture may be allowed. It may start with only one document and may, e.g., also comprise a complete library, i.e., a public library, a library of a research institute or an enterprise library comprising all handbooks of the company. On the other hand, it may be as small as a chat protocol between two programmers regarding a specific problem.

The term 'sequence of terms' may denote a plurality of concatenated linguistic words (in contrast to storage words of a computer memory). They may have been extracted determined from the first, existing knowledge graph by random walks through the existing knowledge graph.

The term 'second sequence of terms' may denote, in contrast to the first sequence of terms, phrases from the new corpus, like single words, a sequence of words, a sentence or a paragraph. The sequence of terms, in particular, the first sequence of terms, may be derived from the existing knowledge graph determined by one or more parsers.

The term 'natural language query' (NLQ) may denote, in general, a question posed by a person in the form of human understandable text in natural language. The NLQ may have to be transformed to a machine-interpretable query. SQL (structured query language) may be one option for a form of machine-interpretable query.

The term 'query embedding vector' may denote an embedding vector generated from the received NLQ. Not every single word may be transformed into an embedding vector; however the key words and its sequence of the NLQ shall be transformed. One form of transformation may be from a character string to a column array of floating-point numbers.

The term 'result sequence of terms' may denote an output of the newly generated knowledge graph system after having received the query sequence of terms as input.

The term 'sequence-to-sequence machine-learning model' (seq2seq) may denote a method or system transforming one sequence of symbols into another sequence of symbols. It does so by use of a recurrent neural network (RNN) or more often LSTM (Long Short-Term Memory) or GRU (Grated Recurrent Unit) to avoid the problem of a vanishing gradient. The context for each item is the output from the previous step. The primary components are one encoder and one decoder network. The encoder turns each item into a corresponding hidden vector containing the item and its context. The decoder reverses the process, turning the vector into an output item, using the previous output as the input context. The seq2seq system may typically comprise of three parts: encoder, intermediate (encoder) vector and decoder.

In the following, a detailed description of the figures will be given. All instructions in the figures are schematic. Firstly, a block diagram of an embodiment of the inventive method for building a new knowledge graph is given. Afterwards, further embodiments, as well as embodiments of the knowledge graph construction system for building a knowledge graph, will be described.

Figure 1:
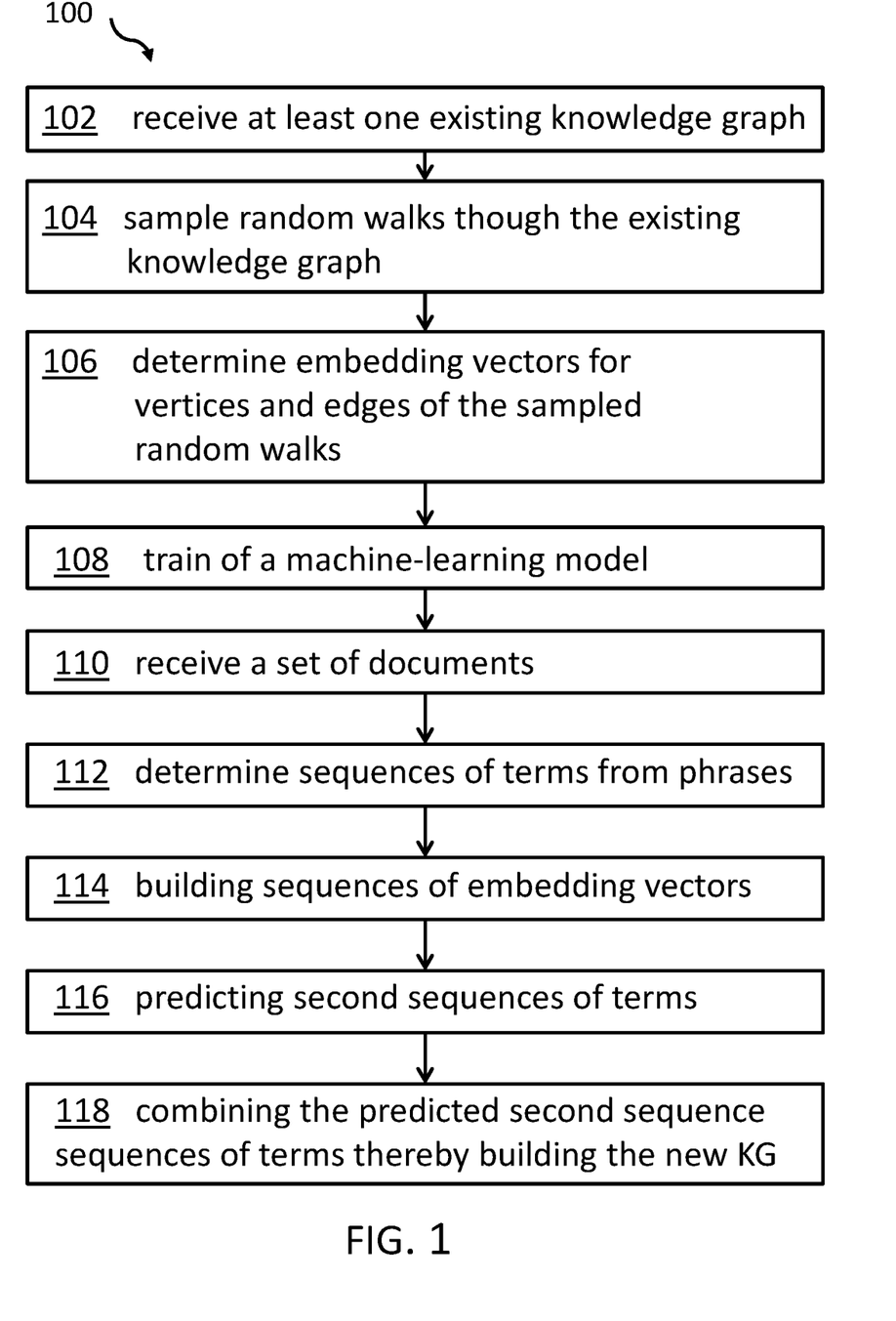
FIG. 1 shows a block diagram of a method for building a new knowledge graph, according to at least one embodiment.

FIG. 1 shows a block diagram of a preferred embodiment of the method 100 for building a new knowledge graph which comprises vertices and edges. Thereby, the edges describe relationships between vertices and the vertices relate to entities, e.g., words, terms, phrases. The method comprises receiving, 102, at least one existing knowledge graph, e.g., for a specific knowledge domain Better may be up to three existing knowledge graphs: one for the training, one for testing, and one for validating a newly trained model. It may also be good to have knowledge graphs available from different experts. Each vertex may relate to a storage adapted for storing a term, the same may apply to each edge. Each edge may additionally provide a storage cell for storing a strength value of the relationship.

The method also comprises sampling, 104, random walks through the at least one existing knowledge graph resulting in a sequence of vertices and edges, i.e., its respective content. The start may be at any randomly selected vertex or one selected according to a preselected rule. The sequences may have variable length. They may end after they may reach the surface of the knowledge graph, i.e., an end leaf.

The method may also comprise determining, 106, embedding vectors for vertices and edges of the sampled random walks, in particular using an existing method, typically resulting in a vector of real number components per edge and per vertex. The embedding vector components may also be selected from a lookup table from a completely different source. Hence, a sequence of embeddings (i.e., embedding vectors) can be generated this way.

Completing the first phase of the method 100, the method 100 also comprises training, 108 of a machine-learning model—in particular of a generally defined architecture with weights for edges—thereby building a trained machine-learning model enabled to predict sequences of terms (which may be used as vertices and edges), taking as input sequences of the embedding vectors of the random walks.

In a next phase, the construction phase, the method 100 comprises also receiving, 110, a set of documents, i.e., a new corpus, ideally from the same domain as the original knowledge graph, determining, 112, sequences of terms from phrases from documents—i.e., at least one document—from the set of documents, and building, 114, sequences of embedding vectors from the determined sequences of terms from the phrases.

Based on this, the method comprises using the built sequences of embedding vectors from the determined sequences of terms from the phrases as input for the trained machine-learning model for predicting, 116, second sequences of terms, and merging, i.e., combining, 118, the predicted second sequences of terms thereby building the new knowledge graph.

Figure 2:
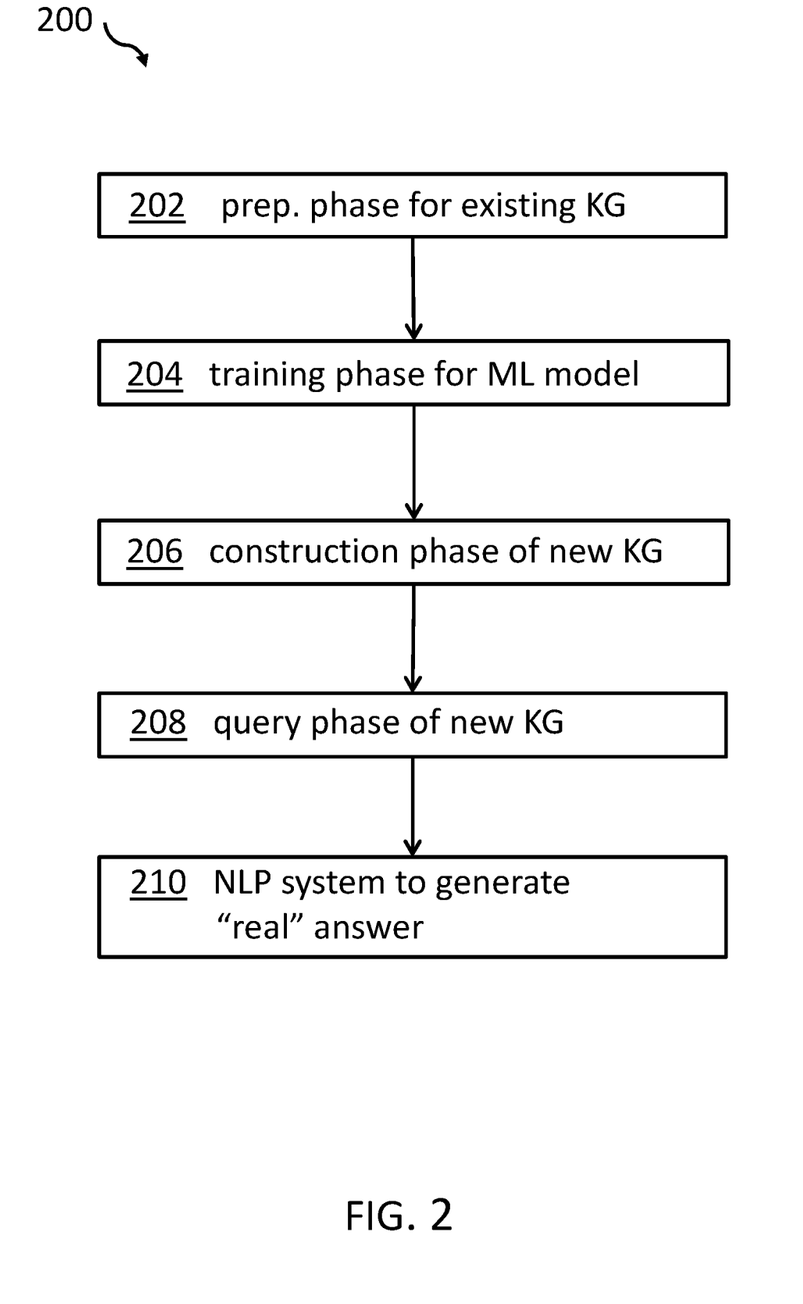
FIG. 2 shows a block diagram of several phases of the construction and the use of the knowledge graph, according to at least one embodiment.

FIG. 2 shows a block diagram of several phases 200 of the construction and the use of the knowledge graph. This may help to enhance the comprehensibility of the method, described in FIG. 1. After a reception of an existing knowledge graph—in particular for a specific knowledge domain—the process starts with a preparation phase 202 for the existing knowledge graph. In this phase, the sample random walks through the existing knowledge graph and a determination of the embedding vectors for the vertices and edges crossed during the random walks are determined (compare step 104, 106 of FIG. 1). Throughout this phase, sets of training values for a machine-learning model are generated: (i) the sequence of vertices and edges (i.e., their respectively stored values) and (ii) the resulting embedding vectors which should be predicted based on a sequence of vertices and edges of the machine-learning model has been trained.

Based on this, the machine-learning model—e.g., in the form of RNNs (recurrent neural network) or using 1D convnets (one-dimensional convolutional network—is trained, 204, using a supervised machine-learning technique. Next, based on the trained machine-learning model, the new knowledge graph based on a new corpus—preferably, from the same knowledge domain—is automatically constructed, 206.

After that, the new knowledge graph may be queried, 208. However, the queries may solely deliver a sequence of terms based on vertices and edges from the knowledge graph. Therefore, it may be advantageous to feed these sequences of vertices and edges into an NLP (natural language processing) system in order to transform the sequences of vertices and edges into human understandable sentences, in particular, to generate "real" answers, 210. The different phases will be more detailed in the following figures.

Figure 3:
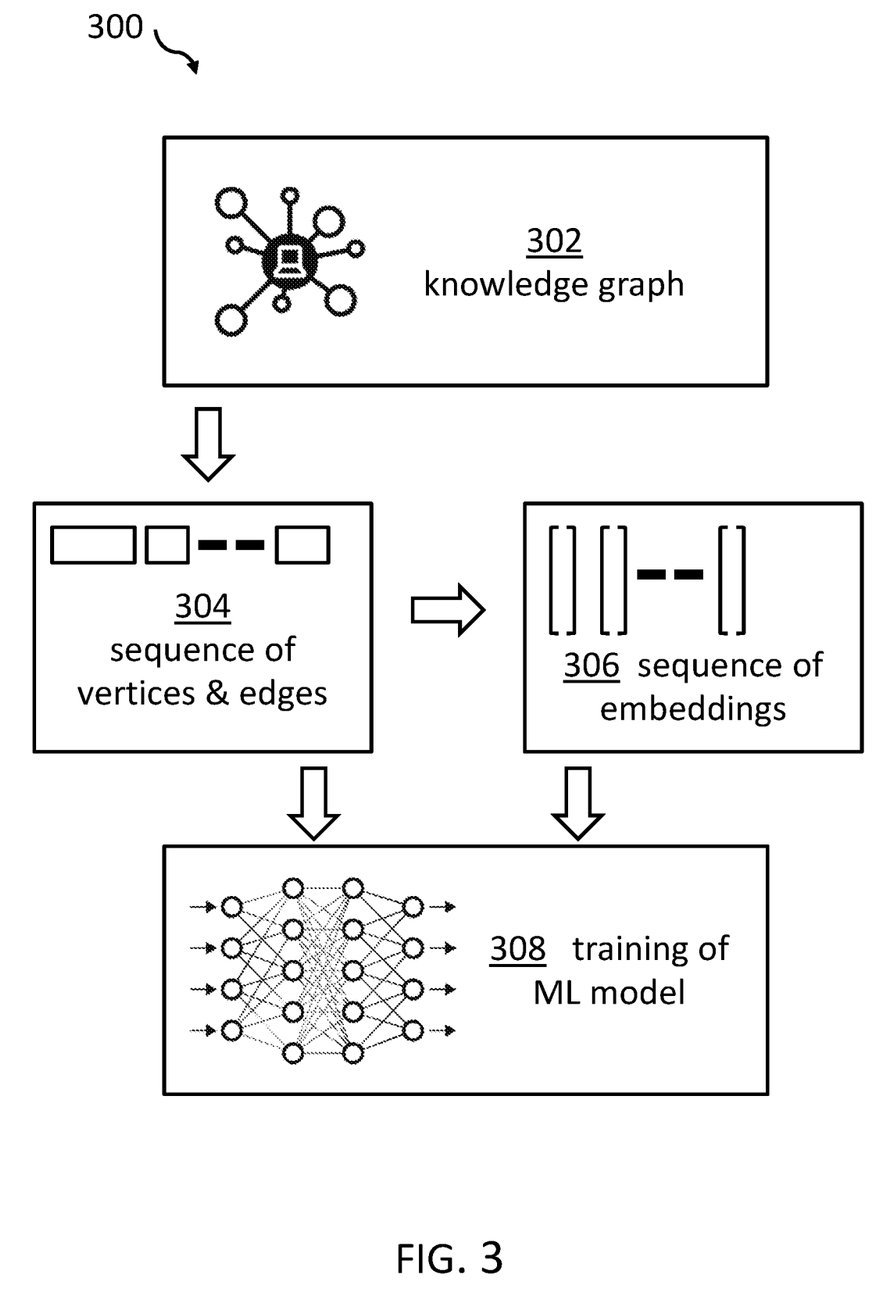
FIG. 3 shows a block diagram of the first phase of the construction of the knowledge graph, according to at least one embodiment.

FIG. 3 shows a block diagram of an embodiment of the first phase 300 (compare FIG. 202, 204 of FIG. 2) of the construction of the new knowledge graph. Firstly, a starting point is an existing knowledge graph 302. It is used to train a machine-learning model. For this, the existing knowledge graph 302 needs to be disassembled. The way to do this is to perform random walks, starting at randomly selected vertices of the knowledge graph or, starting at vertices according to a predefined rule. This results in a sequence 304 of vertices and edges. Known algorithms are used to determine embedding vectors comprising a plurality of real numbers as the components of the vector for each of the values of the sampled vertices and edges. Finally, one has a sequence 306 of embedding vectors that correspond in a 1:1 fashion to the sequence 304 of the vertices and edges. The sequence 304 of sequences and edges are then used as input values for an untrained machine-learning model in order to learn to predict the sequence 306 of embedding vectors. Hence, the machine-learning model 308 is advantageously a sequence-to-sequence machine-learning model.

Figure 4:
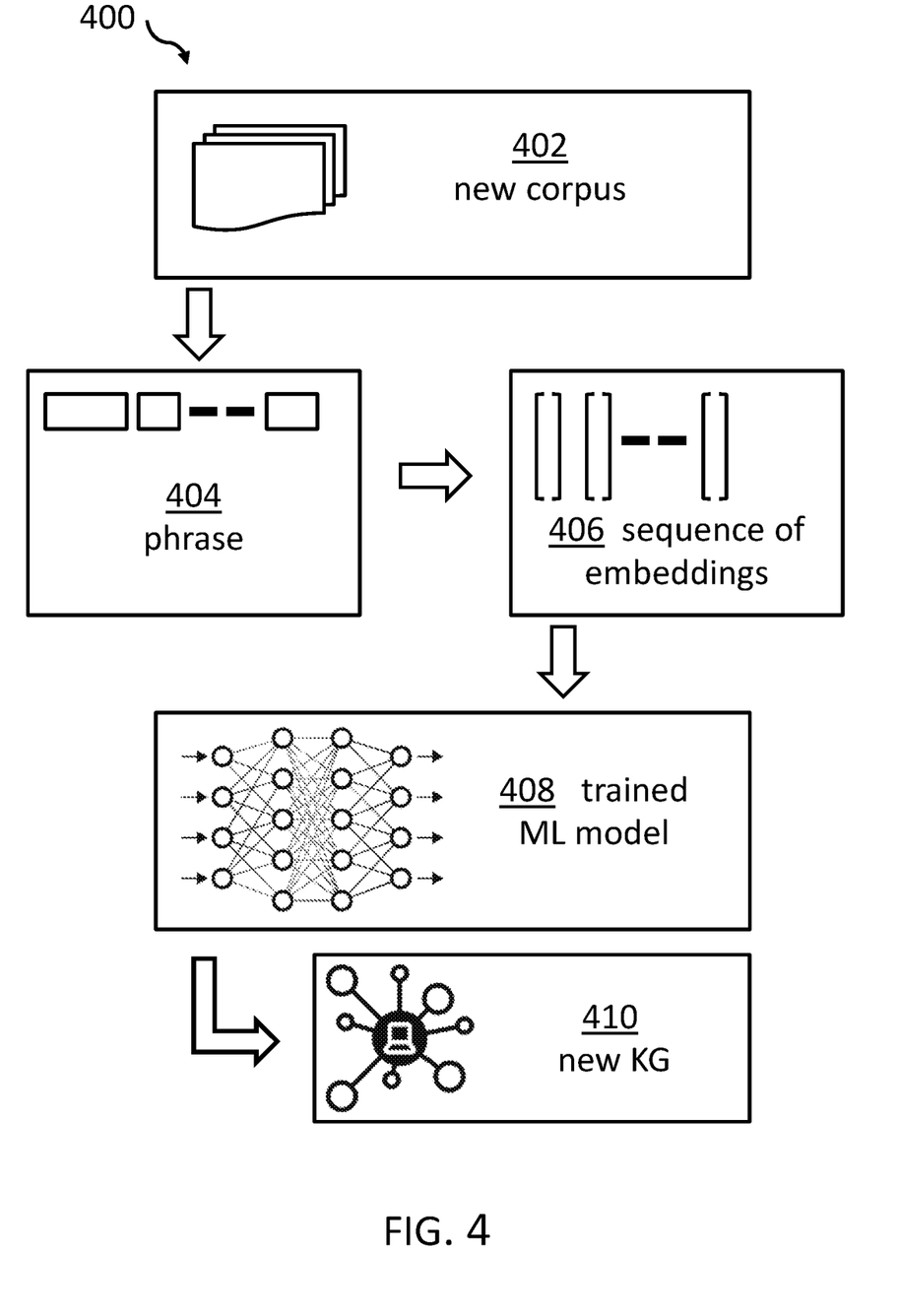
FIG. 4 shows a block diagram of the second phase of the development of the knowledge graph, according to at least one embodiment.

FIG. 4 shows a block diagram of an embodiment of the second phase 400 of the development of the knowledge graph 410. It starts with a new corpus 402 of documents which are not yet organized in knowledge graph form. A set of parsers which may be knowledge-domain dependent or independent can isolate phrases 404 from the new corpus 402. The phrases 404 are typically short sequences of words, single words, complete sentences, or, exceptionally also a complete paragraph. It may also relate figures having a specific identifier in the new corpus to a short phrase. The parsers can also be enabled to keep track of the short phrases and an indication of its original, i.e., its provenance (e.g., a document ID, a paragraph number, a figure identifier, a page within the document, a line on a specific page, etc.).

The so extracted phrases 404 are then converted—by means of known technologies, e.g., in a simpler form using a lookup table—into a sequence 406 of embeddings, e.g., embedding vectors.

These sequences 406 of embedding vectors are then used as input vectors for the trained machine-learning model 408 which, in turn, predicts a sequence of terms, interpretable as triplets of edges and connected vertices. Additionally, the edges may also be predicted with a weight factor value. The plurality of the triplets of edges and connected vertices are then used as a specific storage form of the newly generated knowledge graph 410.

The generation of the new knowledge graph 410 from the new corpus 402 can be performed as a service. And enterprise wanting to generate the new knowledge graph 410 may outsource this to a service provider. It may simply deliver the new corpus 402 to the service provider. The service provider can then use an existing knowledge graph, typically from the same knowledge domain, perform the steps described above and returning the newly created knowledge graph 410 to its customer. Alternatively, the customer may also provide the existing knowledge graph (not shown in FIG. 4, but in FIG. 3) to the service provider in order to have a potentially better link to existing terms used in a special way in a given enterprise.

Figure 5:
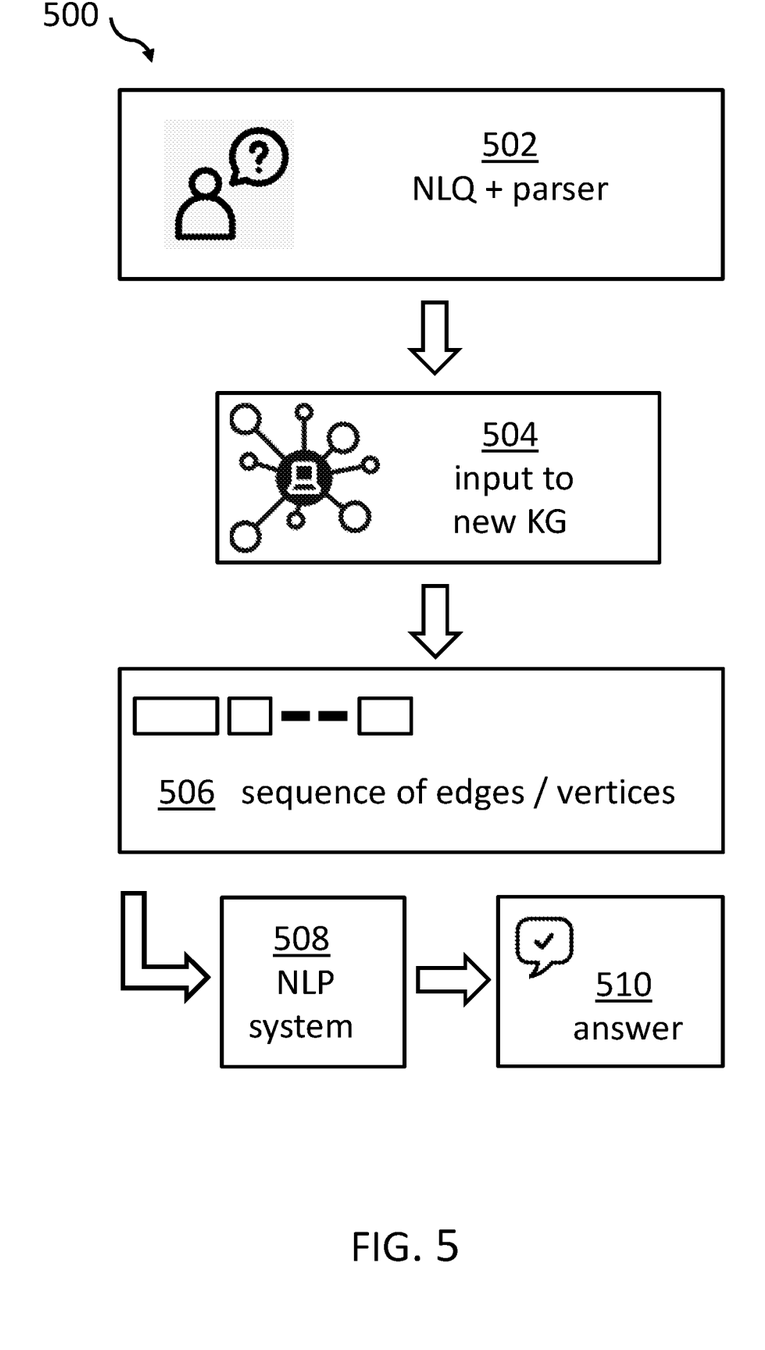
FIG. 5 shows a block diagram of a usage of the knowledge graph as an expert system, according to at least one embodiment.

FIG. 5 shows a block diagram 500 of a usage of the knowledge graph as, e.g., an expert system. A query may be received in natural language form as a natural language query (NLQ). The NLQ can be parsed by one or more parsers (502) to prepare the NLQ—in particular, in form of a human generated question—to be interpretable as input 504 by the generated knowledge graph. The output of the knowledge graph system is typically a sequence 506 of edges and related or linked vertices which may be difficult to interpret by a human being. Therefore, these sequences 506 of edges and vertices from the generated knowledge graph may be fed to an NLP system 508—potentially also based on a trained machine-learning model—in order to transform the sequence 506 of edges and vertices into a human interpretable answer 510.

Figure 6:
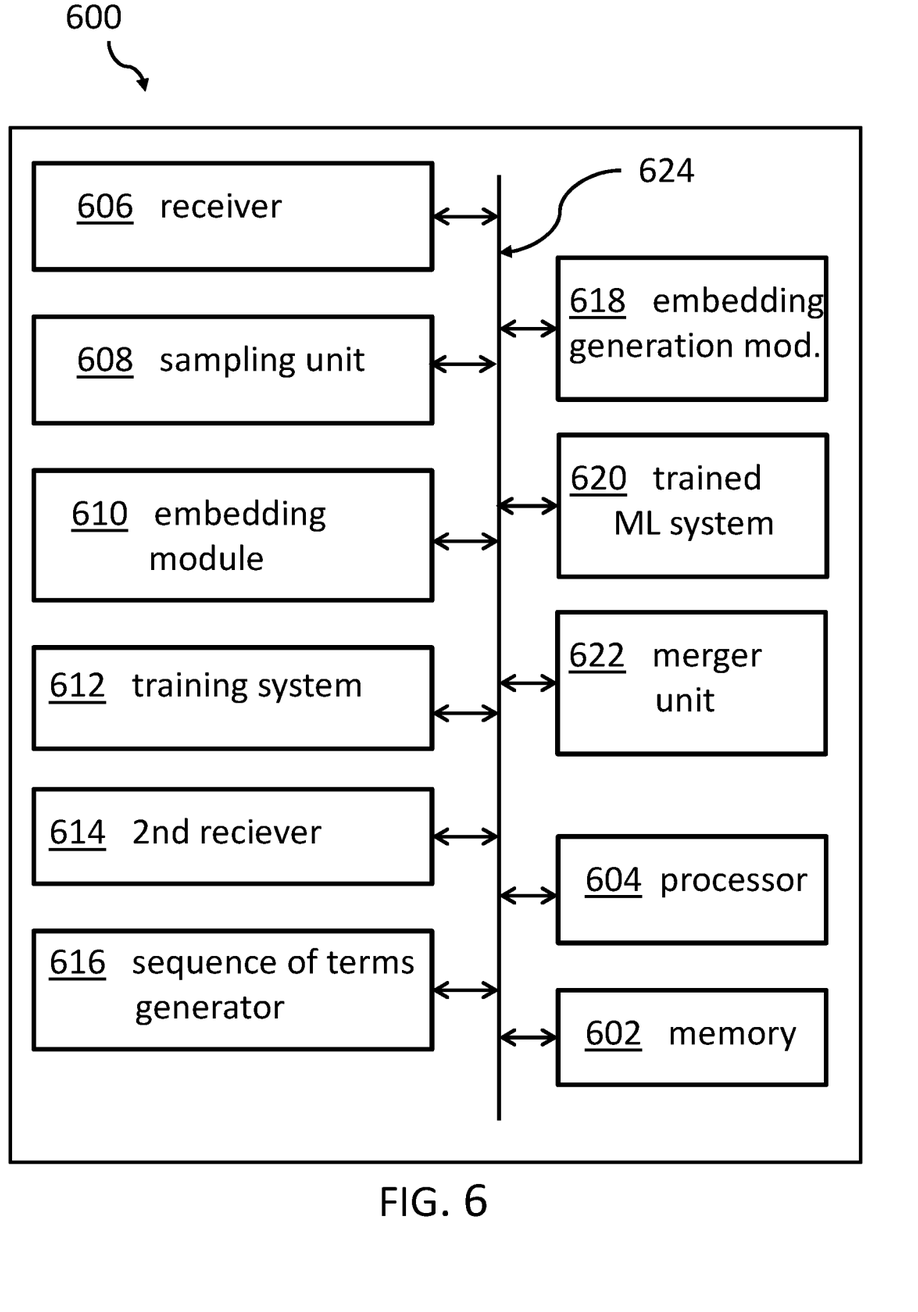

For completeness reasons, FIG. 6 shows a block diagram of an embodiment of the knowledge graph construction system 600. The system comprises a memory 602 communicatively coupled to a processor 604, wherein the processor, using program code stored in the memory, is configured to receive at least one existing knowledge graph—in particular by a receiver 606—sample random walks through the at least one existing knowledge graph—in particular, by a sampling unit 608, determine embedding vectors for vertices and edges of the sampled random walks—in particular, by an embedding module 610—and train the machine-learning model—in particular, by a training system 612—thereby, building a trained machine-learning model enabled to predict sequences of terms, taking as input sequences of said embedding vectors of said random walks.

The processor 604, using program code stored in the memory 602, is also configured to receive a set of documents (i.e. a new corpus)—in particular by a second receiver 614—determine sequences of terms from phrases from documents from said set of documents—in particular by a sequence of terms generator 616—and build sequences of embedding vectors from said determined sequences of terms from said phrases—in particular, by an embedding vector generation module 618.

Furthermore, the processor 604 for, using program code stored in the memory 602, is also configured to predict second sequences of terms by using the built sequences of embedding vectors from the determined sequences of terms from said phrases as input for the trained machine-learning model. The trained machine-learning model, as part of the trained machine-learning system 620 predicts a second sequences of terms and merges said predicted second sequences of terms thereby building said new knowledge graph. The merger may be performed by a merger unit 622.

It may be noted that the units and modules—in particular, the memory 602, the processor 604, the receiver 606, the sampling unit 608, the embedding module 610, the training system 612, the second receiver 614 the sequence of terms generator 616, the embedding vector generator module 618, the trained machine-learning system 620 and the merger unit 622—are electrically interconnected to exchange electrical signals and data between them.

Alternatively, the named units and modules may also be connected for data exchange by a system internal bus system 624.

Figure 7:
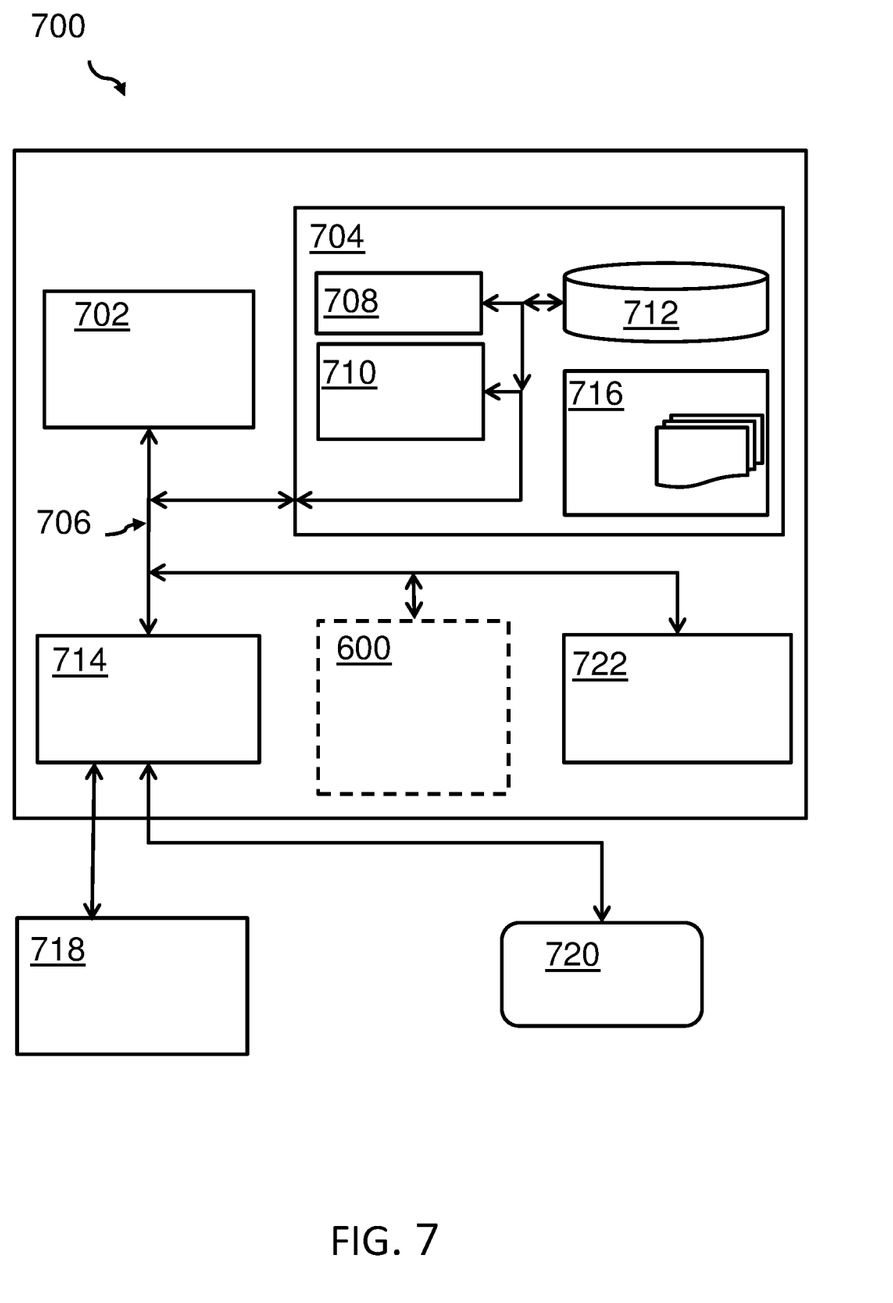

Embodiments of the invention may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the invention described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processing units 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random-access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the invention, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the knowledge graph construction system 600 for building a knowledge graph may be attached to the bus system 706.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept can be summarized in the example examples:

Example 1: A method for building a new knowledge graph, said method comprising: receiving at least one existing knowledge graph; sampling random walks through said at least one existing knowledge graph; determining embedding vectors for vertices and edges of said sampled random walks; training of a machine-learning model thereby building a trained machine-learning model enabled to predict sequences of terms, taking as input sequences of said embedding vectors of said random walks; providing a set of documents; determining sequences of terms from phrases from documents from said set of documents; building sequences of embedding vectors from said determined sequences of terms from said phrases; building sequences of embedding vectors from said determined sequences of terms from said phrases; using said built sequences of embedding vectors from said determined sequences of terms from said phrases as input for said trained machine-learning model for predicting second sequences of terms; and merging said predicted second sequences of terms thereby building said new knowledge graph.

Example 2: The method according to example 1, also comprising: receiving a natural language query comprising a query sequence of terms; determining query embedding vectors for said query sequence of terms; and predicting, using said trained machine-learning model, a result sequence of terms by using said query embedding vectors as input for said trained machine-learning model.

Example 3: The method according to example 1 or 2, also comprising storing said predicted result sequence of terms.

Example 4: The method according to example 2, also comprising returning documents and/or references to documents from said set of provided documents relating to said result sequence terms.

Example 5: The method according to any of the preceding examples, wherein starting points of said random walks are selected from a group comprising: a randomly selected leave of said existing knowledge graph, a root of said existing knowledge graph, and a selected vertex of said existing knowledge graph, wherein said selection is performed based on a predefined rule.

Example 6: The method according to any of the preceding examples, wherein said phrases of said documents are selected from said group comprising an individual term, a plurality subsequent terms, and a sentence.

Example 7: The method according to any of the preceding examples, wherein said machine-learning model is a sequence-to-sequence machine-learning model.

Example 8: The method according to any of the preceding examples, wherein said set of documents is an article, a book, a whitepaper, a newspaper, conference proceedings, a magazine, a chat protocol, a manuscript, handwritten notes, a server log, or an email thread.

Example 9: The method according to any of the preceding examples, wherein said merging comprises: building a plurality of tuples of edges and linked vertices from said predicted second sequence of terms, wherein edges and vertices of said new knowledge graph correspond to terms in said provided set of documents, and wherein metadata for terms characterizing a term as an edge or a vertex is provided as additional output of said trained machine-learning system.

Example 10: The method according to example 9, also comprising storing provenance data for the edges and the vertices together with the edges and the vertices, respectively.

Example 11: The method according to any of the examples 2 to 10, wherein said result sequence of terms is a sequence of edges and related vertices in said knowledge graph.

Example 12: The method according to example 11, wherein a natural language system transforms said sequence of edges and related vertices into a human understandable form.

Example 13: A knowledge graph construction system for building a knowledge graph, said knowledge graph construction system comprising: a memory communicatively coupled to a processor, wherein said processor, using program code stored in said memory, is configured to receive at least one existing knowledge graph; sample random walks through said at least one existing knowledge graph; determine embedding vectors for vertices and edges of said sampled random walks; train a machine-learning model thereby building a trained machine-learning model enabled to predict sequences of terms, taking as input sequences of said embedding vectors of said random walks; provide a set of documents; determine sequences of terms from phrases from documents from said set of documents; build sequences of embedding vectors from said determined sequences of terms from said phrases; use said built sequences of embedding vectors from said determined sequences of terms from said phrases as input for said trained machine-learning model for predicting second sequences of terms; and merge said predicted second sequences of terms thereby building said new knowledge graph.

Example 14: The knowledge graph construction system according to example 13, also comprising: receiving a natural language query comprising a query sequence of terms; determining query embedding vectors for said query sequence of terms; and predicting, using said trained machine-learning model, a result sequence of terms by using said query embedding vectors as input for said trained machine-learning model.

Example 15: The knowledge graph construction system according to example 14, also comprising storing said predicted result sequence of terms.

Example 16: The knowledge graph construction system according to example 14 or 15, also comprising returning documents and/or references to documents from said set of provided documents relating to said result sequence terms.

Example 17: The knowledge graph construction system according to any of the examples 13 to 16, wherein starting points of said random walks are selected from a group comprising: a randomly selected leave of said existing knowledge graph; a root of said existing knowledge graph; and a selected vertex of said existing knowledge graph, wherein said selection is performed based on a predefined rule.

Example 18: The knowledge graph construction system according to any of the examples 13 to 17, wherein said phrases of said documents are selected from said group comprising an individual term, a plurality subsequent terms and, a sentence.

Example 19: The knowledge graph construction system according to any of the examples 13 to 18, wherein said machine-learning model is a sequence-to-sequence machine-learning model.

Example 20: The knowledge graph construction system according to any of the examples 13 to 19, wherein said set of documents is an article, a book, a whitepaper, a newspaper, conference proceedings, a magazine, a chat protocol, a manuscript, handwritten notes, a server log, or an email thread.

Example 21: The knowledge graph construction system according to any of the examples 13 to 20, wherein said merging comprises: building a plurality of tuples of edges and linked vertices from said predicted second sequence of terms, wherein edges and vertices of said new knowledge graph correspond to terms in said provided set of documents, and wherein metadata for terms characterizing a term as an edge or a vertex is provided as additional output of said trained machine-learning system.

Example 22: The knowledge graph construction system according to example 21, also comprising storing provenance data for the edges and the vertices together with the edges and the vertices, respectively.

Example 23: The knowledge graph construction system according to example 14, wherein said result sequence of terms is a sequence of edges and related vertices in said knowledge graph.

Example 24: The knowledge graph construction system according to example 23, wherein a natural language system transforms said sequence of edges and related vertices into a human understandable form.

Example 25: A computer program product for building a knowledge graph, said computer program product comprising a computer readable storage medium having program instructions embodied therewith, said program instructions being executable by one or more computing systems or controllers to cause said one or more computing systems to: receive at least one existing knowledge graph; sample random walks through said at least one existing knowledge graph; determine embedding vectors for vertices and edges of said sampled random walks; train a machine-learning model thereby building a trained machine-learning model enabled to predict sequences of terms, taking as input sequences of said embedding vectors of said random walks; provide a set of documents; determine sequences of terms from phrases from documents from said set of documents; build sequences of embedding vectors from said determined sequences of terms from said phrases; use said built sequences of embedding vectors from said determined sequences of terms from said phrases as input for said trained machine-learning model for predicting second sequences of terms; and merge said predicted second sequences of terms thereby building said new knowledge graph.

What is claimed is:

1. A method for building a new knowledge graph, the method comprising:
   receiving at least one existing knowledge graph;
   sampling random walks through the at least one existing knowledge graph;
   determining embedding vectors for vertices and edges of the sampled random walks;
   training of a machine-learning model thereby building a trained machine-learning model enabled to predict sequences of terms, taking as input sequences of the embedding vectors of the random walks;
   providing a set of documents;
   determining sequences of terms from phrases from documents from the set of documents;
   building sequences of embedding vectors from the determined sequences of terms from the phrases;
   using the built sequences of embedding vectors from the determined sequences of terms from the phrases as input for the trained machine-learning model for predicting second sequences of terms; and
   merging the predicted second sequences of terms thereby building the new knowledge graph.

2. The method according to claim 1, further comprising:
   receiving a natural language query comprising a query sequence of terms;
   determining query embedding vectors for the query sequence of terms; and
   predicting, using the trained machine-learning model, a result sequence of terms by using the query embedding vectors as input for the trained machine-learning model.

3. The method according to claim 2, further comprising:
   storing the predicted result sequence of terms.

4. The method according to claim 2, further comprising:
   returning documents and/or references to documents from the set of provided documents relating to the result sequence terms.

5. The method according to claim 2, wherein the result sequence of terms is a sequence of edges and related vertices in the knowledge graph.

6. The method according to claim 5, wherein a natural language system transforms the sequence of edges and related vertices into a sentence.

7. The method according to claim 1, wherein starting points of the random walks are selected from a group comprising: a randomly selected leave of the existing knowledge graph, a root of the existing knowledge graph, and a selected vertex of the existing knowledge graph, wherein the selection is performed based on a predefined rule.

8. The method according to claim 1, wherein the phrases of the documents are selected from a group comprising an individual term, a plurality subsequent terms, and a sentence.

9. The method according to claim 1, wherein the machine-learning model is a sequence-to-sequence machine-learning model.

10. The method according to claim 1, wherein the second sequence of terms is interpretable as triplets of edges and connected vertices.

11. The method according to claim 1, wherein the merging comprises:
building a plurality of tuples of edges and linked vertices from the predicted second sequence of terms, wherein edges and vertices of the new knowledge graph correspond to terms in the provided set of documents, and wherein metadata for terms characterizing a term as an edge or a vertex is provided as additional output of a trained machine-learning system.

12. The method according to claim 11, further comprising:
storing provenance data for the edges and the vertices together with the edges and the vertices, respectively.

13. A knowledge graph construction system for building a knowledge graph, the knowledge graph construction system comprising:
one or more processors; and
a memory communicatively coupled to the one or more processors, storing program instructions that, when executed by the one or more processors, cause the one or more processors to perform operations comprising:
receiving at least one existing knowledge graph;
sampling random walks through the at least one existing knowledge graph;
determining embedding vectors for vertices and edges of the sampled random walks;
training a machine-learning model thereby building a trained machine-learning model enabled to predict sequences of terms, taking as input sequences of the embedding vectors of the random walks;
providing a set of documents;
determining sequences of terms from phrases from documents from the set of documents;
building sequences of embedding vectors from the determined sequences of terms from the phrases;
using the built sequences of embedding vectors from the determined sequences of terms from the phrases as input for the trained machine-learning model for predicting second sequences of terms; and
merging the predicted second sequences of terms thereby building a new knowledge graph.

14. The knowledge graph construction system of claim 13, wherein the operations further comprise:
receiving a natural language query comprising a query sequence of terms;
determining query embedding vectors for the query sequence of terms; and
predicting, using the trained machine-learning model, a result sequence of terms by using the query embedding vectors as input for the trained machine-learning model.

15. The knowledge graph construction system of claim 14, wherein the operations further comprise:
storing the predicted result sequence of terms.

16. The knowledge graph construction system of claim 14, wherein the operations further comprise:
returning documents and/or references to documents from the set of provided documents relating to the result sequence terms.

17. The knowledge graph construction system of claim 14, wherein the result sequence of terms is a sequence of edges and related vertices in the knowledge graph.

18. The knowledge graph construction system of claim 17, wherein a natural language system transforms the sequence of edges and related vertices into a sentence.

19. The knowledge graph construction system of claim 13, wherein starting points of the random walks are selected from a group comprising: a randomly selected leave of the existing knowledge graph, a root of the existing knowledge graph, and a selected vertex of the existing knowledge graph, wherein the selection is performed based on a predefined rule.

20. The knowledge graph construction system of claim 13, wherein the phrases of the documents are selected from a group comprising an individual term, a plurality subsequent terms and, a sentence.

21. The knowledge graph construction system of claim 13, wherein the machine-learning model is a sequence-to-sequence machine-learning model.

22. The knowledge graph construction system of claim 13, wherein the set of documents is an article, a book, a whitepaper, a newspaper, conference proceedings, a magazine, a chat protocol, a manuscript, handwritten notes, a server log, or an email thread.

23. The knowledge graph construction system of claim 13, wherein the merging further comprises:
building a plurality of tuples of edges and linked vertices from the predicted second sequence of terms, wherein edges and vertices of the new knowledge graph correspond to terms in the provided set of documents, and wherein metadata for terms characterizing a term as an edge or a vertex is provided as additional output of a trained machine-learning system.

24. The knowledge graph construction system of claim 23, the operations comprising:
storing provenance data for the edges and the vertices together with the edges and the vertices, respectively.

25. A computer program product for building a knowledge graph, the computer program product comprising a computer readable storage medium having program instructions embodied therewith, the program instructions being executable by one or more processors to cause the one or more processors to perform operations comprising:
receiving at least one existing knowledge graph;
sampling random walks through the at least one existing knowledge graph;
determining embedding vectors for vertices and edges of the sampled random walks;
training a machine-learning model thereby building a trained machine-learning model enabled to predict sequences of terms, taking as input sequences of the embedding vectors of the random walks;
providing a set of documents;
determining sequences of terms from phrases from documents from the set of documents;
building sequences of embedding vectors from the determined sequences of terms from the phrases;
using the built sequences of embedding vectors from the determined sequences of terms from the phrases as input for the trained machine-learning model for predicting second sequences of terms; and merging the predicted second sequences of terms thereby building a new knowledge graph.

* * * * *